US 7,774,412 B1

(12) United States Patent
Schnepel

(10) Patent No.: US 7,774,412 B1
(45) Date of Patent: Aug. 10, 2010

(54) METHODS AND APPARATUS FACILITATING DISTRIBUTION OF CONTENT

(75) Inventor: Soenke Schnepel, Luetjensee (DE)

(73) Assignee: Adobe Systems Inc., San Jose, CA (US)

( * ) Notice: Subject to any disclaimer, the term of this patent is extended or adjusted under 35 U.S.C. 154(b) by 1483 days.

(21) Appl. No.: 11/123,398

(22) Filed: May 6, 2005

(51) Int. Cl.
G06F 15/16 (2006.01)
(52) U.S. Cl. ..................................... 709/206
(58) Field of Classification Search ................ 709/206, 709/203, 219, 217, 213, 227; 455/466, 414.1, 455/412.1, 566, 414.2, 517; 715/234, 256, 715/236, 205, 200, 738, 760; 707/E17.121, 707/10, E17.116, E17.119, E17.009, 104.1, 707/1; 370/252
See application file for complete search history.

(56) References Cited

U.S. PATENT DOCUMENTS

| | | | |
|---|---|---|---|
| 6,430,624 B1 * | 8/2002 | Jamtgaard et al. ........... 709/246 |
| 6,643,663 B1 * | 11/2003 | Dabney et al. .............. 707/102 |
| 6,985,748 B2 * | 1/2006 | Knotts ........................ 455/466 |
| 7,047,033 B2 * | 5/2006 | Wyler ....................... 455/552.1 |
| 7,072,683 B2 * | 7/2006 | King et al. ................ 455/550.1 |
| 7,092,703 B1 * | 8/2006 | Papineau ..................... 455/418 |
| 7,127,232 B2 * | 10/2006 | O'Neil et al. ............... 455/408 |
| 7,130,616 B2 * | 10/2006 | Janik ........................ 455/412.1 |
| 7,161,590 B2 * | 1/2007 | Daniels ....................... 345/204 |
| 7,373,395 B2 * | 5/2008 | Brailean et al. ............. 709/219 |

* cited by examiner

*Primary Examiner*—Jeffrey Pwu
*Assistant Examiner*—Saad A Waqas
(74) *Attorney, Agent, or Firm*—Chapin IP Law, LLC

(57) ABSTRACT

A client computer converts selected content (e.g., an images, text, audio, etc.) into message formatted content to enable communication of the selected content in a respective message to a picture phone device in a cellular phone network. Additionally, the client computer converts the selected content into web formatted content to enable communication of the selected content to a web browser operating in a web network environment. To make the selected content available for distribution, the client computer creates a web page including a) the web formatted content and b) an address identifying a location of the message format content as it will be stored in a server. The client computer uploads the web page, web formatted content, and message formatted content to a selected server. Viewing of the web page in a browser enables a user to download the message formatted content in the server to a cellular phone.

19 Claims, 12 Drawing Sheets

METHODS AND APPARATUS FACILITATING DISTRIBUTION OF CONTENT

BACKGROUND

As well known, the Internet is a massive network of networks in which computers communicate with each other via use of different communication protocols. The World Wide Web (a.k.a., the web) is a way of accessing information over the internet. Thus, in one sense, the web is one of many different types of information-sharing models built on top of the internet.

A specific type of architecture for communicating over the web is a client-server model. In general, a client in the client-server model is a computer (on the web) in which a browser application (such as Internet Explorer™ or Netscape™) runs. As its name suggests, a server in the client-server model is a computer that serves web documents or web pages over the internet to the client upon request. Based on use of the so-called browser, clients can specify which web pages to retrieve using hyperlinks. Hyperlinks are addresses to servers and, more particularly, web pages that contain graphics, sounds, text, video, other hyperlinks, etc.

One type of protocol for accessing information over the web in the client-server model discussed above is HTTP (Hyper Text Transfer Protocol). The HTTP protocol is one of multiple communication protocols supported by the Internet to allow applications to communicate and exchange information. Based on use of the web and, more particularly, use of the HTTP protocol over the web, a user at a client computer can retrieve information from a remote server (i.e., another computer) over the Internet via hyperlinks.

Use of the web is just one way to exploit the Internet. Other ways of disseminating information over the Internet (and not the web) include use of e-mail, which relies on SMTP (Simple Mail Transfer Protocol).

Needless to say, there has been an explosion regarding use of the Internet to share information. In addition to the explosion of the Internet, there has also been an explosion regarding use of cellular telephones. Today, cellular phones have become so advanced that so-called picture phones (e.g., cellular phones with display capability) can be used to take and send pictures to other cellular phones. Web sites currently exist to download images or multi-media messages (e.g., multi-media content encoded according to MMS or the Multimedia Messaging Service standard) to picture phones in a cellular network. Thus, using a browser at a client computer, a user on the web can select and download content such as images, text, sound, etc. to a cellular-based picture phone.

SUMMARY

Conventional techniques for facilitating distribution of content such as MMS-based messages suffer from a number of deficiencies. For example, conventional services for generating downloadable content (such as those based on the MMS standard) to cell phones exist only at remote servers. That is, the remote servers process content to create MMS-based messages for downloading to cellular phones. Providing such services only at a remote server makes it difficult for an individual or non-commercial user of the web to create respective MMS portals (e.g., services that provide distribution of MMS-based messages such as multimedia content formatted according to a Multimedia Message Servicing format) without having to contract with a third-party company who provides and supports these services. Furthermore, it is difficult because the user has no control or less control over websites, conversions, etc. because the information resides at a remote server under control of another entity. This is one reason why so few MMS web portals (e.g., web pages that enable distribution of content to cellular phone devices) exist today.

Another deficiency of conventional MMS content distribution techniques is that a content provider (an entity providing content to be used in messages to cellular phones) needs to provide corresponding content in a specific way in order for the third-party company to create respective MMS-based messages at the remote server. Thus, a content provider attempting to create downloadable MMS-based messages may be forced into buying software to convert files into the appropriate format prior to downloading the content to the server for conversion. If the content is not in an appropriate format for programs running on conventional servers, the content cannot be incorporated and converted into respective MMS-based messages.

Today, most third parties and operators provide solutions for converting content on their server prior sending the content through their networks. For example, if a content provider tries to send content which does not fit the MMS specifications and/or the operator MMSC specifications (data size limitations, MMS typically cannot exceed 100 KB or 300 KB), the third party will attempt to convert the content appropriately. At a minimum, an operator will at least check the content.

In certain cases, the content provider does not know how the media files will be converted at the server. Thus, the content provider typically has no control over a quality of images (color depth, image size) or audio files produced by the server for inclusion in MMS-based messages. In other words, the content provider is at the mercy of the server as to the quality of an image or audio file being created for use in a respective MMS-based message.

Accordingly, the current conventional solution known in the art to generate MMS-based messages is an inefficient database driven, server-side solution requiring cooperation of many entities.

Techniques discussed in this application deviate with respect to conventional techniques of generating MMS-based messages for transmission to mobile devices such as cellular phones supporting multimedia messaging capability. In particular, embodiments of the present application include mechanisms and techniques to facilitate a process of distributing content from a web-based environment to a message servicing network environment such as a cellular phone environment. The message servicing network environment is capable of operating independently of the web network environment to deliver messages to cellular phone device. For example, the message servicing network enables a first messaging device (e.g., a picture phone) to send a message such as a picture to a second messaging device (e.g., another picture phone) without the message going through the Internet or web network. The cellular phone environment, in some respects, can be viewed as a message servicing environment to the extent that MMS-based messages (e.g., messages encoded based on Synchronized Multimedia Integration Language) are delivered to specific cellular phones according to cell phone protocols instead of web-based communication protocols. Accordingly, a technique as further described herein involves enabling web page developers at client computers to more easily create and display messages for downloading to cellular phones (e.g., mobile phones) in a message servicing environment such as a cellular network. For example, the tools herein enable creators of mobile content to more easily optimize a use of different formatted content.

More specifically, according to one embodiment herein, a client computer in a web network environment enables a user (e.g., web page developer) to initially select content (e.g., an image, text, audio, etc.). The client computer, utilizing a message format, converts the selected content into message formatted content to enable communication of the selected content in a respective message to a device in a message servicing network environment such as a cellular phone network. Additionally, the client computer converts the selected content into web formatted content to enable communication of the selected content to a web browser in the web network environment.

To make the selected content available for distribution, the client computer creates a web page including a) the web formatted content and b) an address identifying a location of the message format content (which can be delivered to a cell phone) as it will be stored in a server. The client computer uploads the created web page, web formatted content, and message formatted content to a selected server.

The web page, when downloaded from the server and displayed in a browser, enables selection of the web formatted content associated with the web page. For example, when downloaded, the web page displays the web formatted content for possible selection by a user viewing the browser. In other words, the browser utilizes the web formatted content to display a rendering of the content to the user. The browser enables selection of a destination device such as a cellular phone in which to deliver the content or rendering thereof. For example, when content such as an image displayed in the web page is selected by the user, the browser displaying the web page prompts the user to provide a destination identifier such as a cellular phone number to which the user wants to send the content. In response to selection of the web formatted content and the destination device, the browser initiates generation of a request to a gateway provider (e.g., a resource other than the server). The gateway provider, in turn, retrieves the message formatted content from the server based on the identifier and delivers the message formatted content to a respective destination device. In addition to enabling selection of a destination node in which to send the content, the web page further enables payment to the gateway provider from the entity initiating delivery of the message formatted content in the server to the destination device in the message servicing network environment.

Consequently, one purpose of creating a web page or MMS portal and uploading it to the server is to enable delivery of MMS-based messages (e.g., message formatted content or such as graphics, video clips, sound files, text messages, etc.) retrieved from the server to a destination cellular phone device.

Other embodiments herein include a computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Yet other embodiments herein include software programs to perform the steps and operations summarized above and as will be disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system herein can be embodied strictly as a software program, as software and hardware, or as hardware alone such as within a processor, or within an operating system or a within a software application. Example embodiments of the invention may be implemented within products and/or software applications manufactured by Adobe Systems, Inc. of San Jose, Calif., USA.

As discussed above, techniques of the present application are well suited for use in computer systems that facilitate creation of MMS web portals for distribution of content to mobile phones in cellular networks. However, it should be noted that embodiments of the present application are not limited to use in such applications and that the techniques discussed herein are well suited for use in other applications as well. Additional features of the content distribution system will be further discussed via the Detailed Description section of this application as well as accompanying figures.

BRIEF DESCRIPTION OF THE DRAWINGS

The foregoing and other objects, features, and advantages of the present application will be apparent from the following more particular description of preferred embodiments of the present application, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
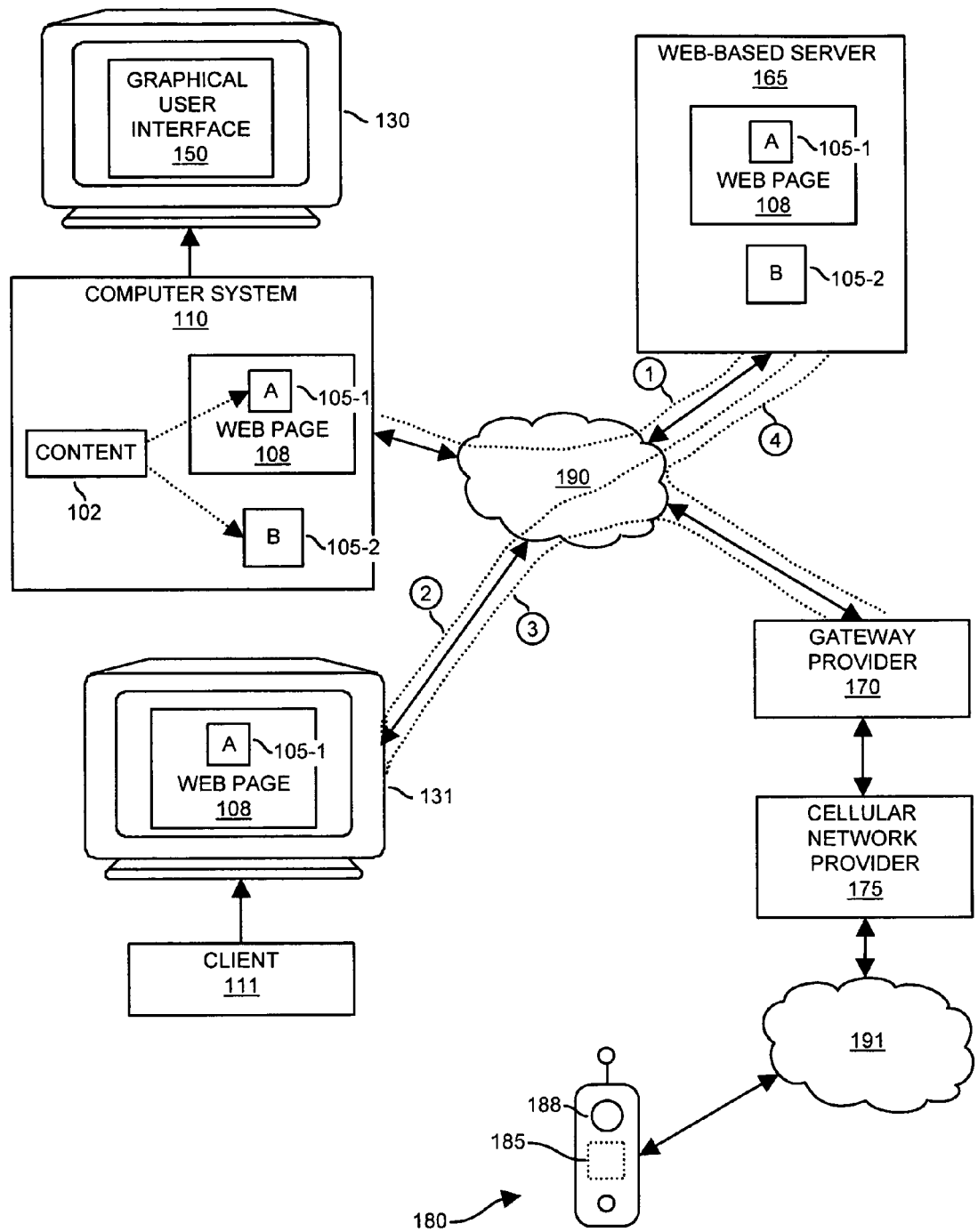
FIG. 1 is a diagram of an environment facilitating distribution of content according to an embodiment herein.

According to one embodiment herein, a client computer facilitates distribution of MMS-based messages for transmission to devices such as cellular phones (e.g., picture phones) supporting multimedia messaging capability. For example, one embodiment herein includes a technique to distribute content from a web-based environment to a cellular phone environment. The existing cellular phone environment, in some respects, can be viewed as a mobile message servicing network environment to the extent that MMS-based messages (e.g., messages encoded based on Synchronized Multimedia Integration Language or SMIL) can be delivered to specific cellular phones according to cell phone protocols in conjunction with use of web-based communication protocols. Accordingly, a technique as further described herein involves enabling web page developers at client computers to more easily create and display messages facilitating dissemination or downloading of the messages to cellular phones.

More specifically, according to one embodiment herein, a client computer in a web network environment enables a web page developer to initially select content (e.g., an image, text, audio, etc.). The client computer, utilizing a message format, converts the selected content into message formatted content to enable communication of the selected content in a respective message to a device in the message servicing network environment such as a cellular phone network. Note that, in certain embodiments, the client computer can rely on use of external resources to convert content into an appropriate format as well as perform conversion itself. Additionally, the client computer converts the selected content into web formatted content to enable a browser to download a web page including a visual rendering of the web formatted content. To make the selected content above available for distribution, the client computer creates a web page for displaying a visual rendering of the content. When a user viewing the web page with a browser selects or clicks on the visual rendering of the content in the web page, the web page in the browser (e.g., via Java code) sends a remote gateway provider an address identifying a location of the message formatted content in the server. In turn, the gateway provider utilizes the address to communicate with the server and delivers the message formatted content retrieved from the server to a target cellular phone device. In this way, a client computer can convert content into web formatted content for displaying a preview of the content in a web page as well as convert the content into message formatted content suitable for serving the content from a server to a cellular phone device. Although gateway providers and/or operators usually take care of what kind of content will be distributed through their network, it can be risky for an operator network to disclaim a whole message if it contains invalid content. Accordingly, in such a case, customers who use conventional methods must handle this potential conflict.

FIG. 1 is a block diagram illustrating a communication environment 100 to facilitate distributing content according to an embodiment herein. As shown, communication environment 100 includes computer system 110 and corresponding display 130 operated by a user such as a web page developer. In one embodiment, computer system 110 includes appropriate peripheral devices (e.g., keyboard, mouse, etc.), applications and corresponding processes, operating system and corresponding processes, file systems, repository for storing files, etc. Display 130 of computer system 110 displays graphical user interface 150 enabling user to perform various functions as will be described herein. In addition to computer system 110, communication environment 100 further includes client 111 and associated display screen 131, network 190 (e.g., a web-based network), web-based server 165, gateway provider 170, cellular network provider 175 (e.g., an operator), network 191 (e.g., a cellular or wireless network), and device 180 (e.g., a cellular phone device). Note that actual implementations of communication environment 100 in the field can vary depending on the application.

In general, in the context shown in FIG. 1, computer system 110 enables a web page developer to select content 102 (e.g., an image, a video clip, text, audio file, etc.) and create web pages. For example, computer system 110 converts selected content 102 into web formatted content 105-1 (also labeled as "A") and message formatted content 105-2 (also labeled as "B"). A formatting of web formatted content 105-1 enables inclusion of a rendering of the content 102 in web pages (e.g., web page 108) while the formatting of message formatted content 105-2 (e.g., a message encoded according to an MMS standard) enables transmission of a rendering of the content 102 to one or more target device 180 that plays back a respective message (e.g., a multimedia message) on a display screen 185 and speaker 188.

More specifically, graphical user interface 150 enables a web page developer to select content 102 and initiate inclusion of a rendering (e.g., web formatted content 105-1) of the content 102 in a web page 108. As previously discussed, one purpose of creating the web page 108 is to enable users such as those at client 111 viewing the web page to select and download messages including content to devices associated with network 191. Note that web page 108 can include multiple entries of other web formatted content as well as web formatted content 105-1.

Upon completion of creating or generating web page 108, computer system 110 uploads (or publishes) web page 108 as well as web formatted content 105-1 and message formatted content 105-2 to server 165 (e.g., a web-based server in a web environment).

Based upon a request by client 111, server 165 serves web page 108 including web formatted content 105-1 to client 111. Depending on how the web page 108 has been created, web page 108 can include a visual rendering of content 102 as well as visual renderings of other content that can be selectively downloaded to device 180. Accordingly, one purpose of web page 108 is to display content or multimedia messages that can be downloaded to device 180.

Although computer system 110 and client 111 are shown as different computers, the computer system 110 can also download web page 108 and perform similar operations as discussed for client 111. However, the configuration as shown enables a first entity such as a web page developer at computer system 110 to create web pages so that one or more second entities such as users at client 111 or the like viewing the web page 108 can download respective messages (e.g., MMS based messages encoded according to SMIL) to target devices in cellular network 191.

Suppose in this example that a user viewing web page 108 at client 111 selects web formatted content 105-1 in web page 108 for sending respective encoded content 102 (e.g., message formatted content 105-2) as a message to device 180 of network 191. To complete the delivery, the web page 108 (e.g., encoded via Java) prompts the user for a phone number associated with the device 180. The user at client 111 also provides a mobile phone number in which to deliver a respective message. Consequently, the user can select a specific message of displayed content in the web page 108 to be delivered as well as a target destination (as identified by the phone number) for delivery of the message to the respective target device.

In this instance, based on selection of web formatted content 105-1 in web page 108 and a phone number of device 180, the web page 108 initiates transmission of an address identifier to gateway provider 170 as well as transmission of the phone number associated with device 180 to the gateway provider 170. The address identifier such as a URL (Uniform Resource Locator) points to a storage location (in server 165) of message formatted content 105-2 (e.g., MMS based messages encoded according to SMIL), which is a respective message associated with content 102 stored in server 165 to be delivered to device 180.

Gateway provider 170 utilizes the address identifier to retrieve message formatted content 105-2 from server 165 and deliver the message to cellular network provider 175. For security purposes, gateway provider 170 can retrieve message formatted content 105-2 as encrypted data using HTTP. Further, gateway provider 170 can communicate message formatted content 105-2 over a VPN (Virtual Private Network) to cellular network provider 175 (e.g., network operator) providing message services to device 180. The gateway provider 170 utilizes the destination phone number to identify which cellular network provider 175 or operator to forward the message for delivery to device 180.

Cellular network provider 175 forwards the message formatted content 105-2 received from the gateway provider 170 to device 180 over network 191 (e.g., a cellular phone network). Depending on the embodiment, cellular network provider 175 either delivers the message to device 180 or provides an indication to device 180 that a new message has been received and can be downloaded upon request from cellular network provider 175 for playback by a user of device 180. Accordingly, in this way, a user can utilize a web-based environment for selection and delivery of an MMS-based message in a message servicing network environment. According to one configuration, the message servicing network environment can operate independently of the web network environment to deliver messages to device 180. For example, such a message servicing network enables a first messaging device (e.g., a picture phone) to send a message such as a picture to a second messaging device (e.g., another picture phone) without the message going through the Internet or web network. According to further configurations, the message servicing network environment enables phone devices to retrieve multimedia message at least partially conveyed over the web network environment. For example, the message servicing network environment supports i) delivery of the message formatted content to the wireless device from the server, and ) communications between a wireless phone device and other wireless phone devices in which the communications are conveyed independently of the web network environment.

FIGS. 2-9 are screenshots of a graphical user interface 150 facilitating generation of web page 108 and distribution of content to cellular phone devices. In one embodiment, computer system 110 generates a wizard (e.g., an interactive help utility that guides a web page developer through each step of a task) for generating web pages capable of displaying downloadable MMS-based messages.

Figure 2:
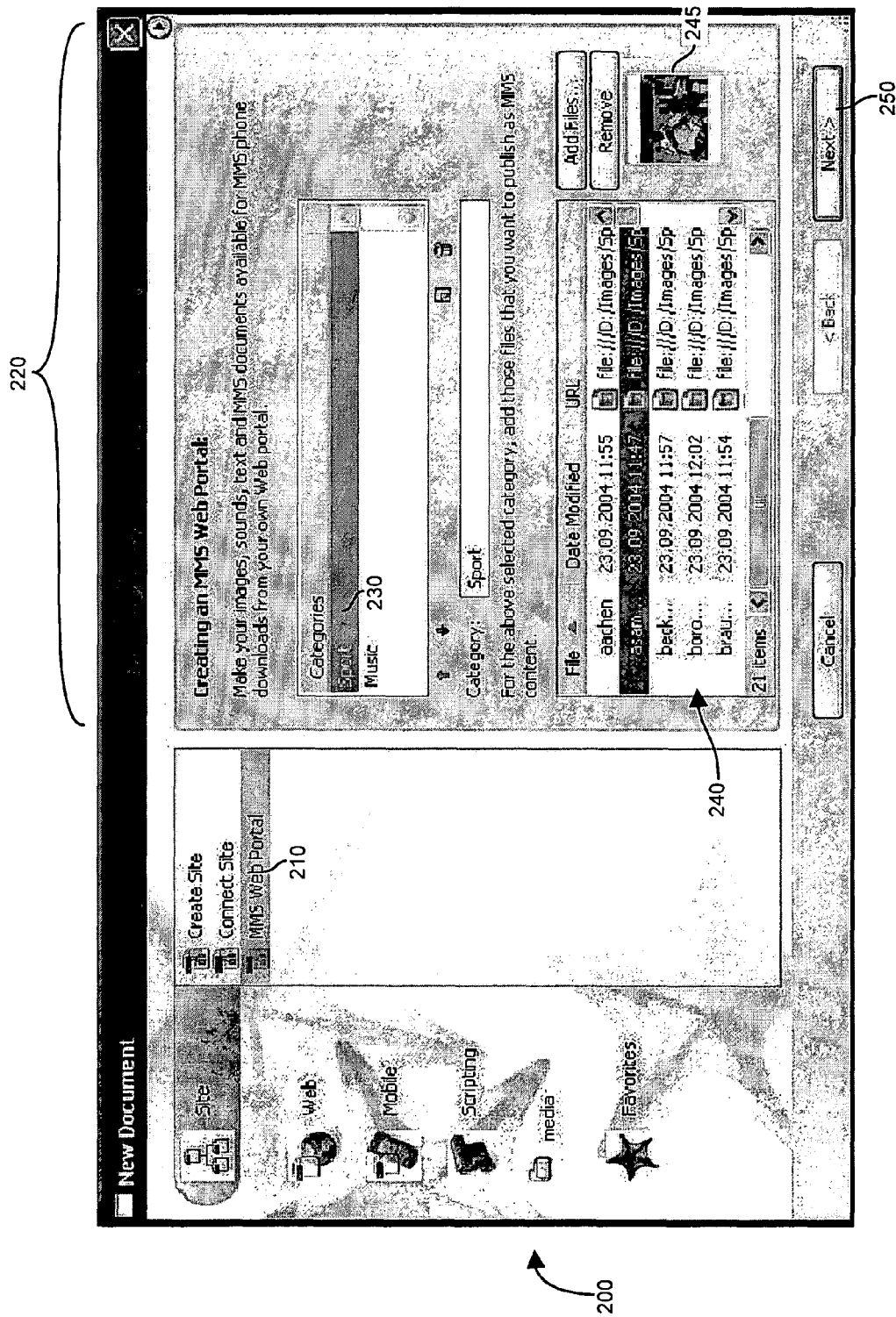
FIG. 2 is a screenshot of a graphical user interface enabling selection of content according to an embodiment herein.

More particularly, FIG. 2 is a screenshot 200 enabling a web page developer at computer system 110 to create an MMS web portal. For example, a user viewing screenshot 200 initially selects display region 210 to create an MMS web portal (e.g., web page). In response to the selection, graphical user interface 150 associated with computer system 110 populates display region 220 with further control options. Display region 230 includes a listing of potential categories (e.g., web pages with similar content) in which to publish selected content. In the present example, the user selects the "sport" category for adding an MMS-based message for inclusion in a respective web page 108.

Display region 240 includes a listing of content (e.g., raw content) that can be converted into an MMS-based message. Upon selection of a file such as an image file, display region 245 displays a thumbnail view (e.g., miniature picture view) of the selected content so that the user can view a rendering of the associated content before including it in a respective web page for downloading to phone devices. Upon selection of icon 250, computer system 110 displays screenshot 300 as shown in FIG. 3.

Figure 3:
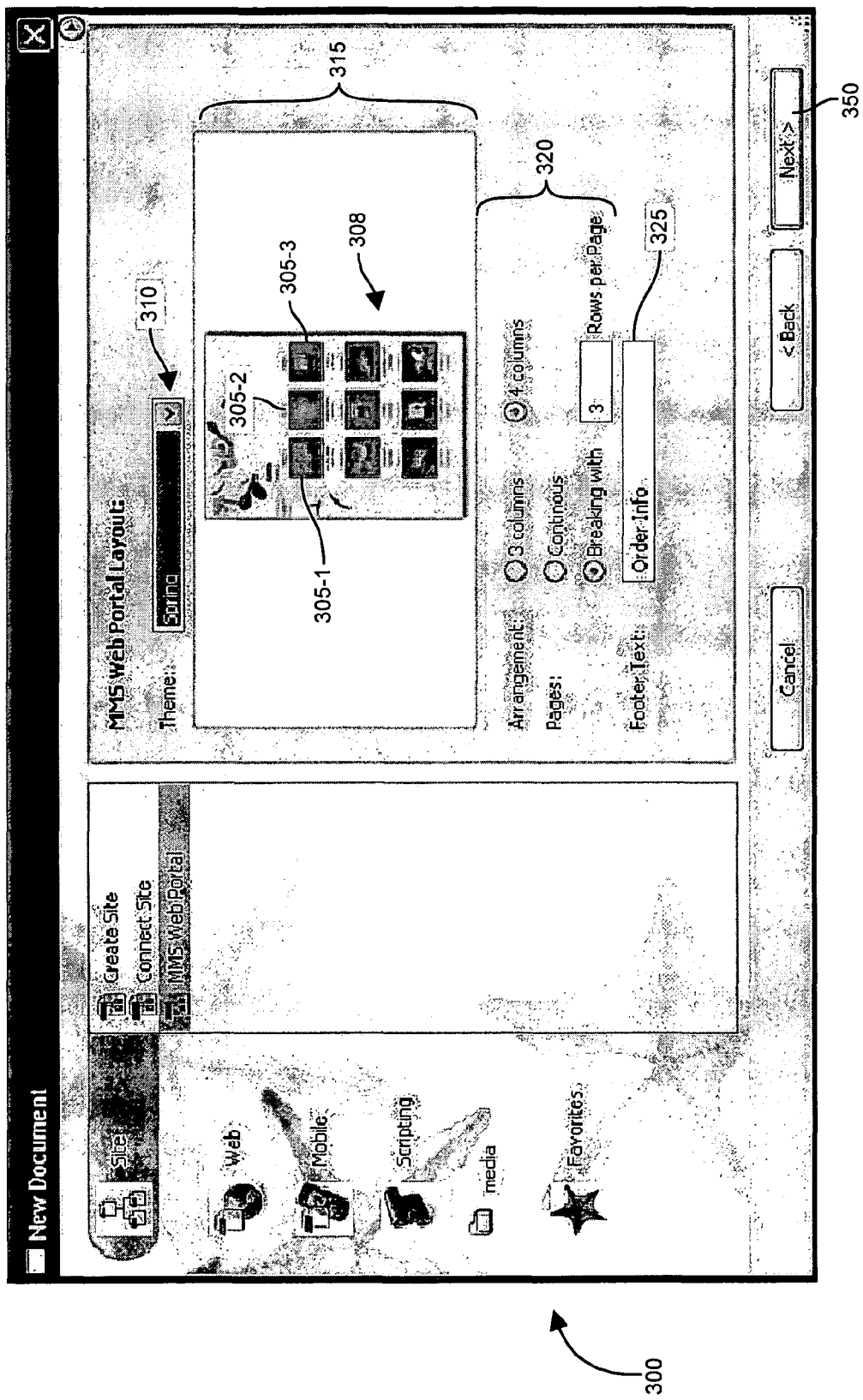
FIG. 3 is a screenshot of a graphical user interface enabling custom layout of a web page including downloadable content according to an embodiment herein.

FIG. 3 is a screenshot 300 enabling a web page developer at computer system 110 to select an MMS web portal layout. For example, a web page developer can specify a theme in display region 310 to select a background or visual theme to be displayed for a respective category of downloadable messages 305 (e.g., 305-1, 305-2, 305-3, ... ). For example, web page 308 in display region 315 includes a presentation of downloadable messages 305 as well as a visual background theme as identified by a selected theme in display region 310. Display region 320 in screenshot 300 enables a web page developer to select how the downloadable messages 305 appear in a respective web page 308. Input data field 325 enables the user to type in text for display beneath each of the downloadable messages 305. In the present example, the user displays the words "Order Information" beneath the downloadable messages 305. Upon selection of icon 350, computer system 110 displays screenshot 400 as shown in FIG. 4.

Figure 4:
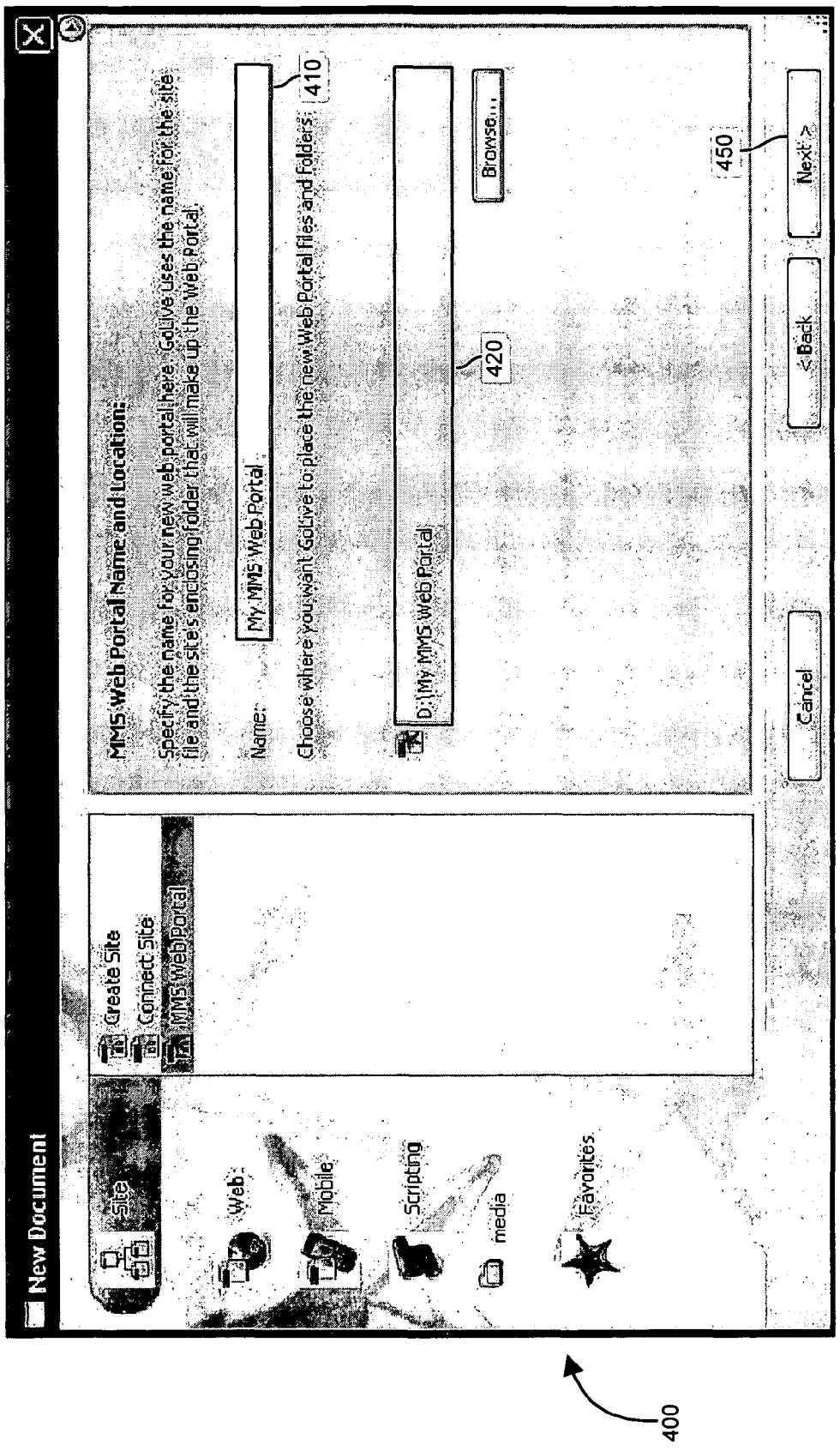
FIG. 4 is a screenshot of a graphical user interface enabling selection of a name and storage location for a web portal according to an embodiment herein.

FIG. 4 is a screenshot 400 enabling a web page developer to name an MMS web portal (e.g., a web page for displaying downloadable messages) as well as choose a location for storing respective web portal files and folders. For example, the web page developer at computer system 110 provides a text string in data field 410 to name the web portal. Data field 420 enables the web page developer to indicate where to store information associated with the newly created MMS web portal. Upon selection of icon 450 by web page developer, computer system 110 displays screenshot 500 as shown in FIG. 5.

Figure 5:
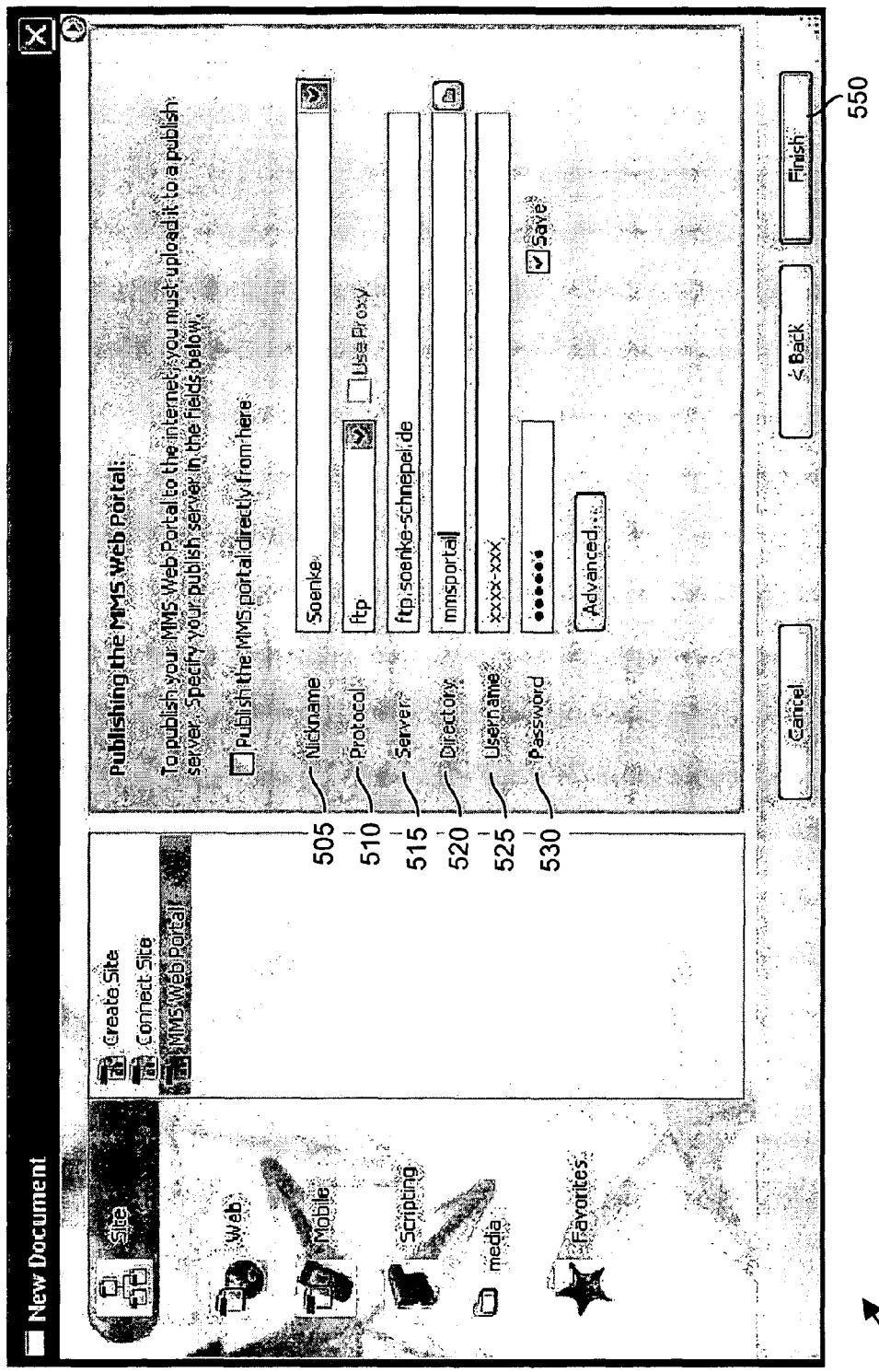
FIG. 5 is a screenshot of a graphical user interface enabling an upload of a web page and MMS portal according to an embodiment herein.

FIG. 5 is a screenshot 500 enabling a web page developer to publish an MMS web portal layout to server 165. For example, after creating an MMS web portal, the web page developer forwards the created web page and related information to a server so that other users (or the web page developer) can view and initiate delivery of downloadable messages via the newly created web page.

To publish (as previously discussed in FIG. 1) a newly created web page to the server 165, the web page developer provides the following information. For example, the web page developer provides a nickname in input data field 505. Additionally, the web page developer specifies a protocol in input data field 515 and directory 520 for uploading the web page to the server 165. The information in input data field 520 specifies the name of the server that the web page shall be published (e.g., uploaded and made available for access by browsers in a web environment accessing the server 165). For security purposes, in order to publish to server 165, the web page developer provides a name and password in respective input data fields 525 and 530. Upon selection of icon 550, computer system 110 initiates publication or uploading of a created web page and associated information (e.g., web formatted content and message formatted content for entries in the web page) to server 165.

Figure 6:
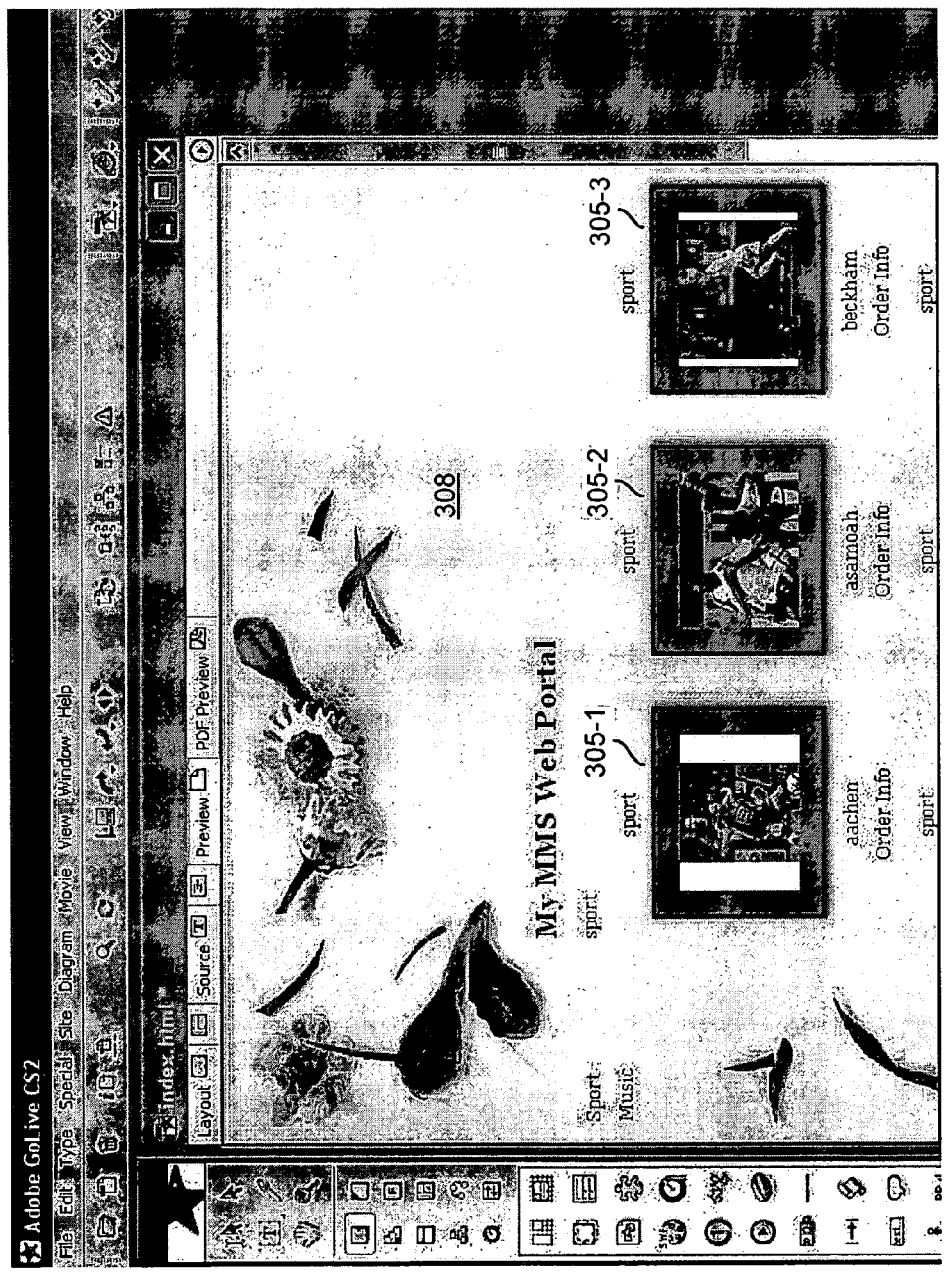
FIG. 6 is a screenshot of a graphical user interface enabling a user to preview of a web page prior to publication to a server according to an embodiment herein.

FIG. 6 is a screenshot 600 enabling a web page developer to preview a web page (e.g., MMS web portal) prior to publication or uploading to server 165. As shown, web page 308 includes a display of downloadable messages 305 (e.g., content).

Figure 7:
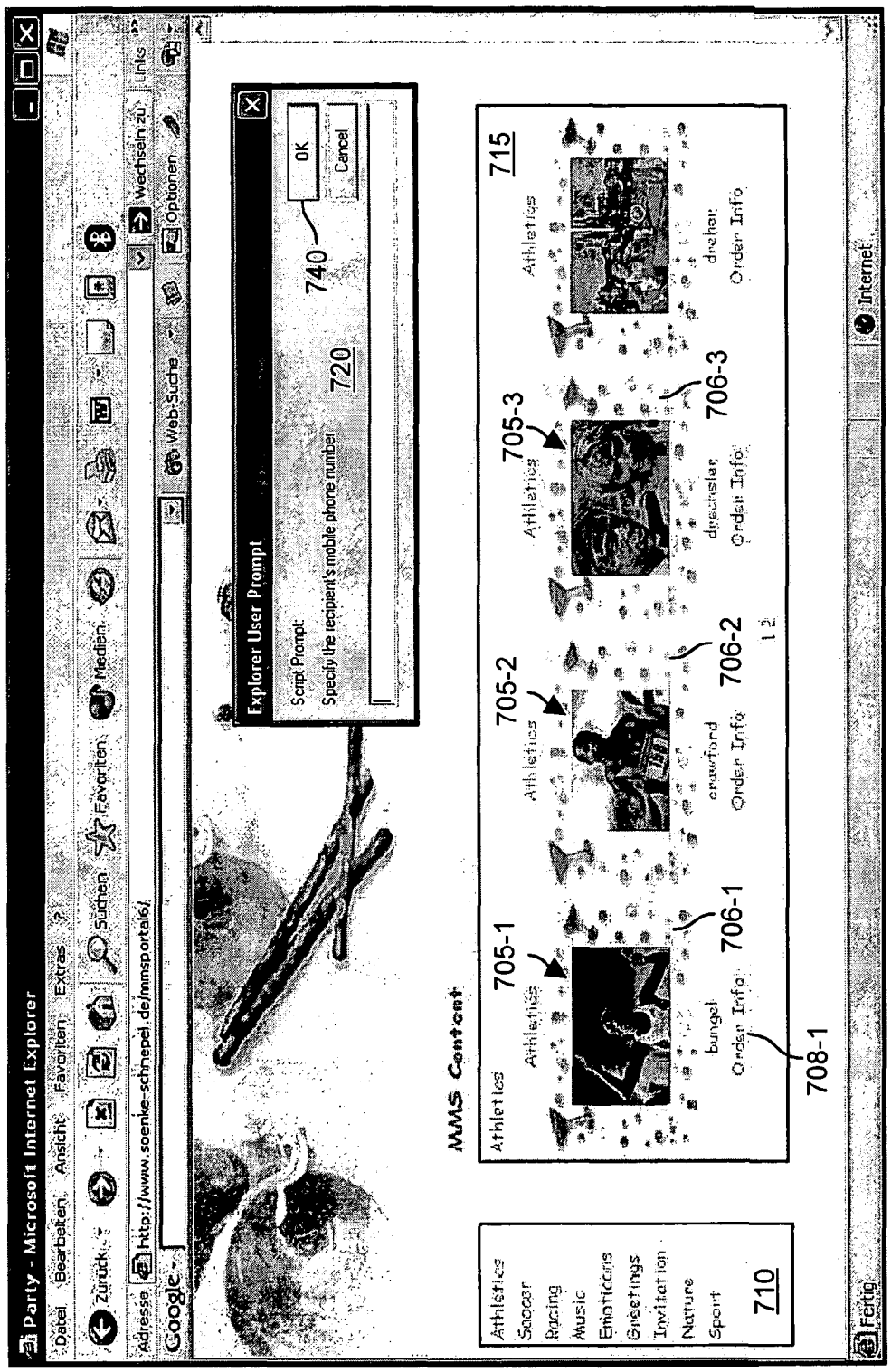
FIG. 7 is a screenshot of a graphical user interface illustrating a downloaded web page in which a viewer can initiate downloading of a message to a cellular phone according to an embodiment herein.

FIG. 7 is a screenshot 700 illustrating how a web page appears to a user viewing a browser such as at client 111 (as shown in FIG. 1). Display region 710 identifies different types of categories that can be selected for viewing downloadable content.

In the example shown, the user selects the "Athletics" category for viewing in a browser. Consequently, display region 715 in screenshot 700 displays downloadable content 705-1, 705-2, 705-3, . . . and respective frames 706-1, 706-2, 706-3, . . . .

Upon selection of downloadable content such as display region 708-1 (e.g., "Order Info") in the present example, the browser of client 111 generates pop-up window 720 prompting the user to provide a phone number to forward the respective selected content in a message to a target device. After entering a number and clicking on icon 740, the browser in client 111 can (if necessary) prompt the user with additional pop-up windows to secure payment associated with the download transaction. In other words, the browser in client 111 (e.g., via Java code associated with the web page) can prompt the user downloading the selected content for a credit card or Paypal™ account in order to make payment for delivery of the selected content to the target device. Recipients of all or part of the proceeds of a download transaction can include a network operator (e.g., a cellular network provider), the gateway provider, the entity creating the MMS web portal, etc. Note also that all or a portion of billing associated with downloaded content can be paid by the owner of a cell phone device receiving the rendering of the content.

Figure 8:
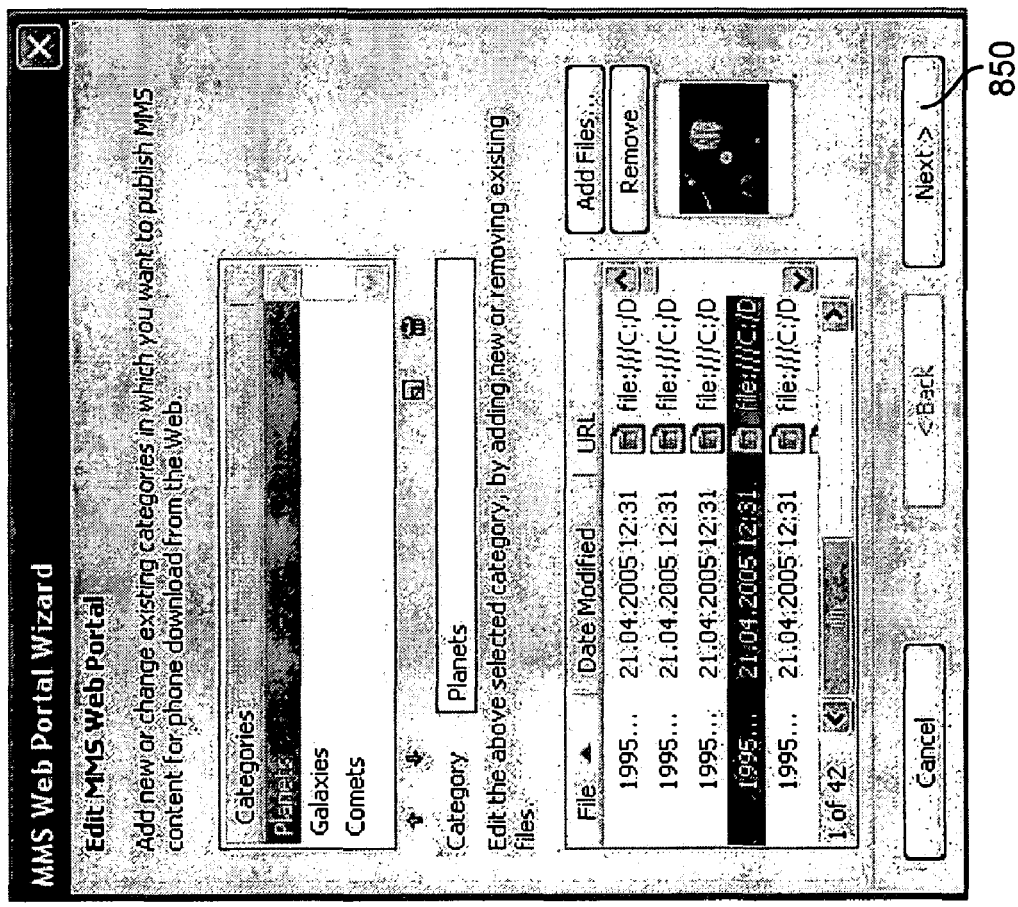
FIG. 8 is a screenshot of a graphical user interface enabling a user to edit a web portal after publication according to an embodiment herein.

In addition to supporting creation of MMS web portals or web pages for delivery of selectable content, computer system 110 also enables a web page developer to modify existing web pages published to server 165 via the screenshot 800 of graphical user interface 150 in FIG. 8. For example, the web page developer can select a category of a web page to be modified and, thereafter, add new or remove existing files to modify which content can be downloaded from a respective web page. Upon completion of adding or removing files, the user selects icon 850 prompt the graphical user interface 150 of computer system 110 to display screenshot 900 on display screen 130 as shown in FIG. 9.

Figure 9:
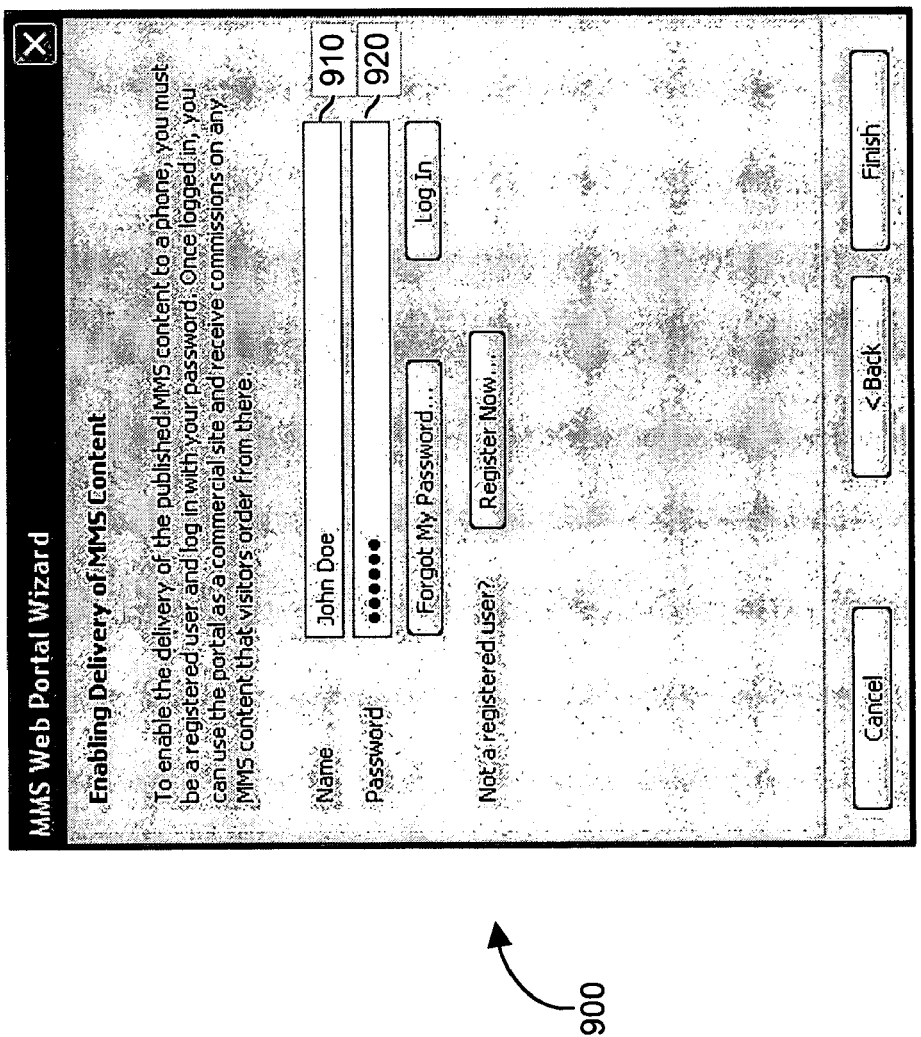
FIG. 9 is a screenshot of a graphical user interface illustrating a technique of enabling delivery of MMS content according to an embodiment herein.

FIG. 9 is screenshot 900 enabling the web page developer to upload a modified web page to server 165. For example, the web page developer provides her name in display region 910 and password in display region 920 to upload the modified web page to server 165. Accordingly, graphical user interface 250 supports generation of new web pages and modifications of previously uploaded web pages.

Figure 10:
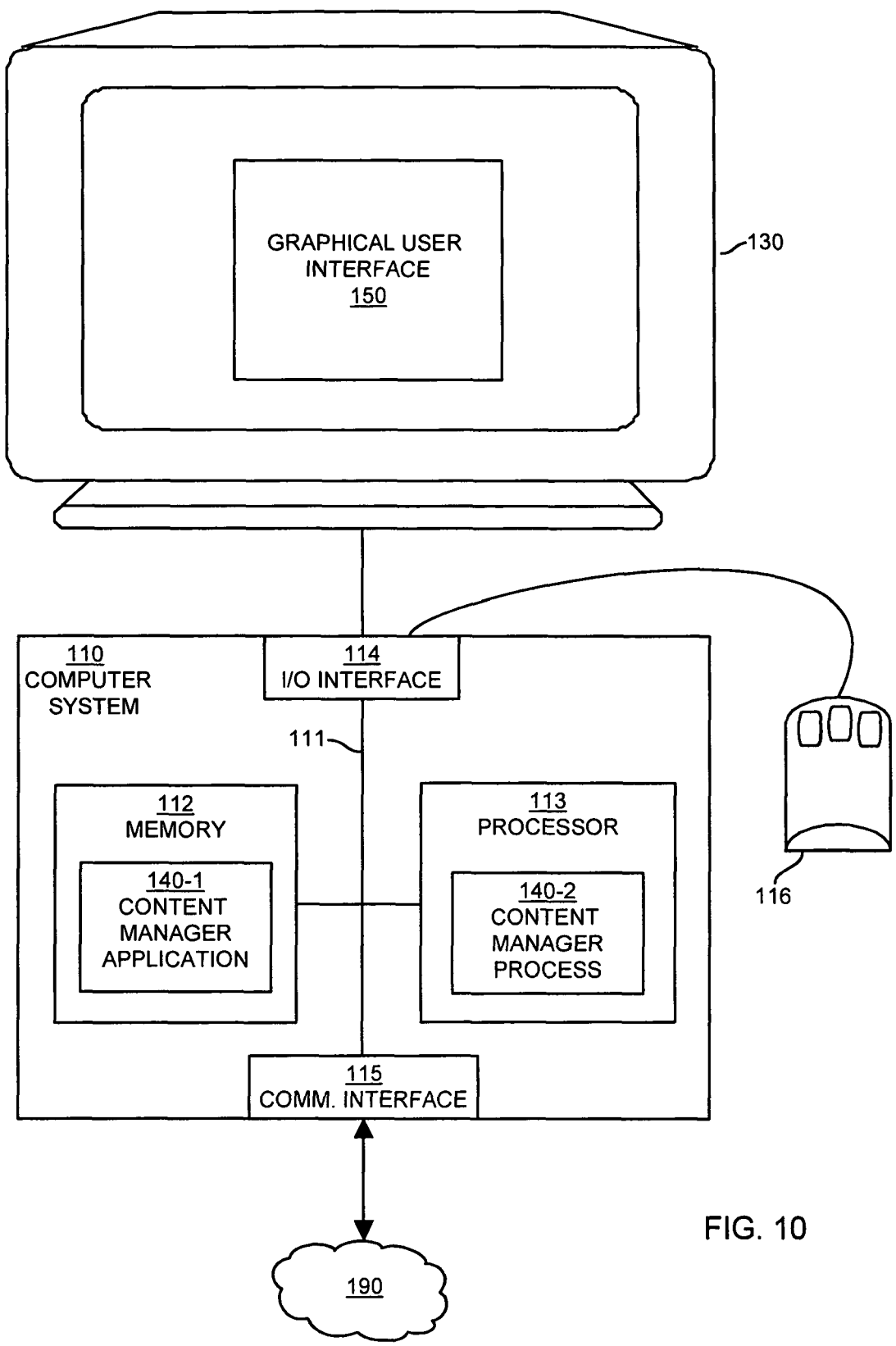
FIG. 10 is a diagram of a processing platform on which to execute software according to an embodiment herein.

FIG. 10 is a block diagram illustrating an example architecture of computer system 110 that executes, runs, interprets, operates or otherwise performs content management application 140-1 and content management process 140-2 to generate graphical user interface 150 and wizard as previously discussed in FIGS. 2-9. As shown, a web page developer controls input to graphical user interface 150 on display 130 based on input device 116 (e.g., a handheld mouse, keyboard, etc.). Computer system 110 may be any type of computerized device such as a personal computer, workstation, portable computing device, console, laptop, network terminal or the like.

As shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, etc.) couples to processor 113 through I/O interface 114 and enables a user to provide input commands and generally control the graphical user interface 150 and generate web pages to distribute content. The communications interface 115 enables the computer system 110 to communicate with other devices (i.e., other computers) on a network 190 and retrieve content for inclusion in a web page. Computer system 110 also can retrieve content stored in its own repository.

Memory system 112 is any type of computer readable medium and in this example, is encoded with a content management application 140-1 supporting generation, display, and implementation of functional operations of the graphical user interface 150 as explained herein. The content management application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the content management application 140-1. Execution of content management application 140-1 in this manner produces processing functionality in content management process 140-2. In other words, the content management process 140-2 represents one or more portions or runtime instances of the content management application 140-1 (or the entire application 140-1) performing or executing within or upon the processor 113 in the computerized device 110 at runtime.

It should be noted that example configurations disclosed herein include the content management application 140-1 itself (i.e., in the form of un-executed or non-performing logic instructions and/or data) that is stored on a computer readable medium (such as a floppy disk), hard disk, electronic, magnetic, optical or other computer readable medium. The content management application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the content management application 140-1 in the processor 113 as the content management process 140-2. Those skilled in the art will understand that the computer system 110 may include other processes and/or software and hardware components or systems not shown in this example.

Figure 11:
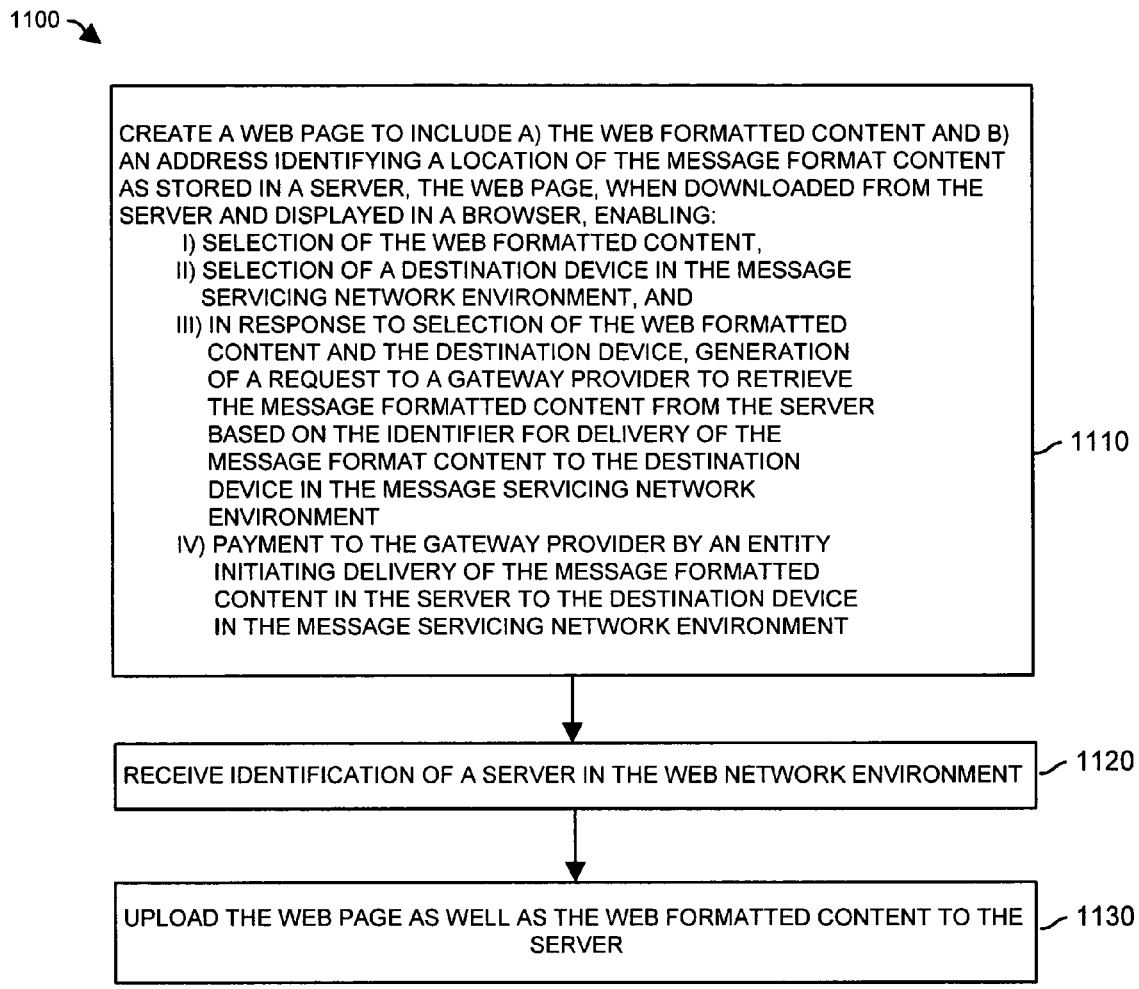
FIG. 11 is a flowchart illustrating a process of creating a web page including selectable messages according to an embodiment herein.

FIG. 11 is a flowchart 1100 illustrating a technique summarizing creation of web pages from the perspective of computer system 110 according to an embodiment herein. The following steps reference entities as shown in FIG. 1.

In step 1110 of FIG. 11, computer system 110 creates a web page 108 to include a) the web formatted content 105-1 and b) an address identifying a location of the message formatted content 105-2 as stored in a server 165. The web page 108, when downloaded from the server 165 and displayed in a respective browser at client 111, enables:

i) selection of the web formatted content 105-1 in a web page 108, ii) selection of a destination device 180 in a mobile message servicing network environment such as network 191, iii) in response to selection of the web formatted content 105-1 and the destination device 180, generation of a request to a gateway provider 170 to retrieve the message formatted content 105-2 from the server 165 based on the identifier for delivery of the message format content 105-2 to the destination device 180 in the mobile message servicing network environment, and iv) payment to the gateway provider 170 by an entity initiating delivery of the message formatted content 105-2 in the server 165 to the destination device 180 in the mobile message servicing network environment.

In step 1120, computer system 110 receives identification of server 165 in the web network environment based on a user selecting a publication server.

In step 1130, computer system 110 uploads the web page 108 as well as the web formatted content 105-1 to the server 165.

Figure 12:
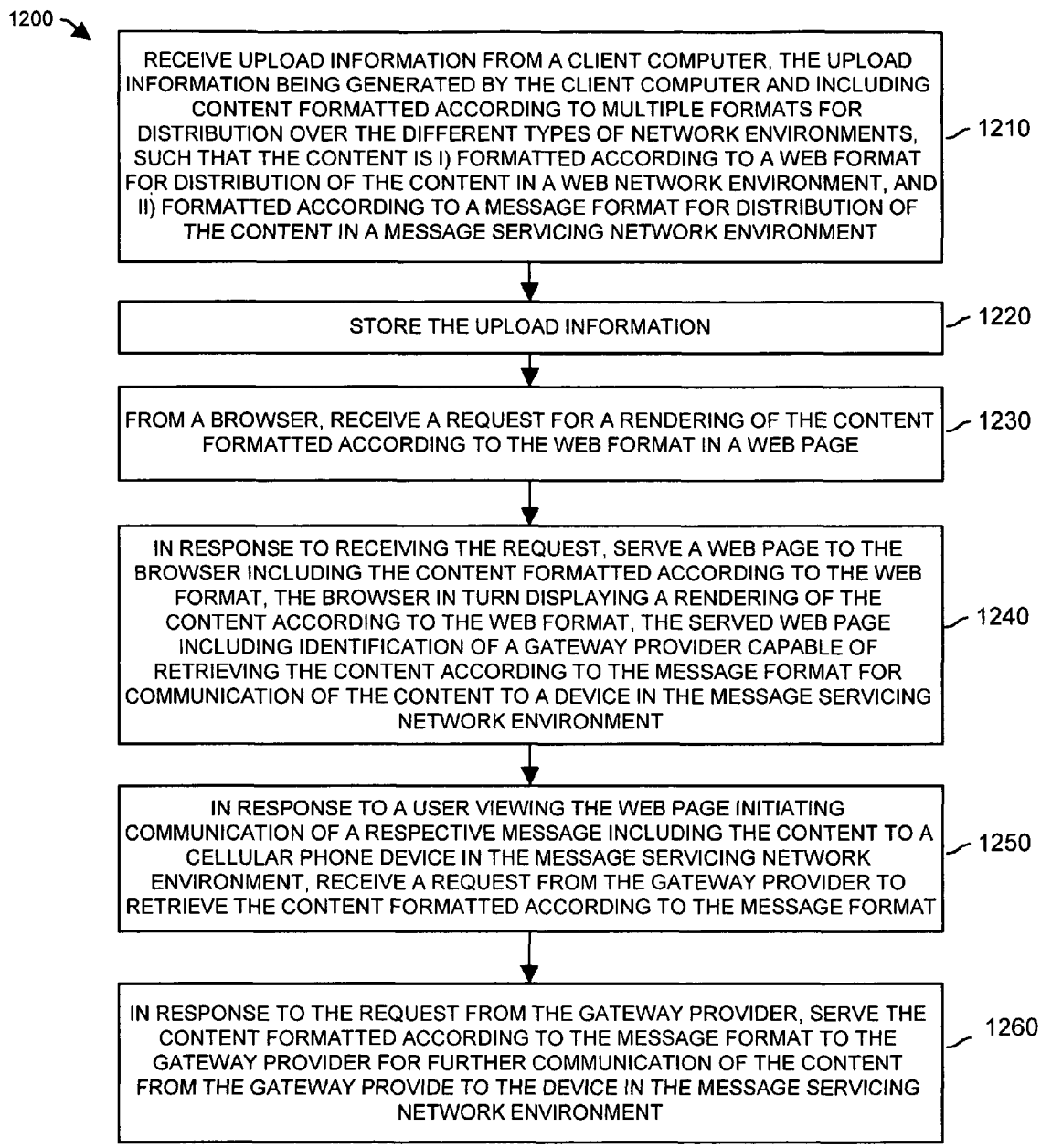
FIG. 12 is a flowchart illustrating a technique of facilitating distribution of content from the perspective of a server according to an embodiment herein.

FIG. 12 is a flowchart 1200 illustrating a technique of storing and serving content from the perspective of server 165 according to an embodiment herein.

In step 1210, server 165 receives upload information from a client computer (e.g., computer system 110). The upload information has been generated by the computer system 110 and includes content 102 formatted according to multiple formats for distribution over the different types of network environments. For example, the content 102 is i) formatted according to a web format (e.g., as web formatted content 105-1) for distribution of the content 102 in a web network environment such as network 190, and ii) formatted according to a message format (e.g., as message formatted content 105-2) for distribution of the content 102 in a message servicing network environment such as network 191.

In step 1220, server 165 stores the upload information.

In step 1230, from a browser such as at client 111, server 165 receives a request for a rendering of the content formatted according to the web format in a web page 108.

In step 1240, in response to receiving the request, server 165 serves a web page 108 to the browser including the content 102 formatted according to the web format. The browser in turn displays a rendering of the content 102 according to the web format. The served web page 108 includes an identification of gateway provider 170 capable of retrieving the message formatted content 105-2 for communication of the content 102 to a device 180 in the message servicing network environment.

In step 1250, in response to a user viewing the web page 108 initiating communication of a respective message including the message formatted content 105-2 to a cellular phone device 180 in the message servicing network environment, server 165 receives a request from the gateway provider 170 to retrieve the content 102 formatted according to the message format.

In step 1260, in response to the request from the gateway provider 170, server 165 serves the content 102 formatted according to the message format to the gateway provider 170 for further communication of the message formatted content 105-2 from the gateway provider 170 to the device 180 in the message servicing network environment.

Techniques of the embodiments discussed herein are well suited for use in computer systems that facilitate creation of MMS web portals for distribution of content to remote devices such as mobile picture phones. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method in which a client computer operates in a web network environment, the client computer initiating execution of software instructions stored in memory to facilitate distribution of content, the computer-implemented method comprising:

receiving selected content;

converting the selected content into message formatted content to enable communication of the selected content in a respective message through a message servicing network environment to a mobile device, the message servicing network capable of operating independently of the web network environment to deliver messages to the mobile device;

receiving identification of a server in the web network environment;

transmitting the message formatted content to the server;

converting the selected content into web formatted content to enable communication of the selected content to a browser operating in the web network environment;

transmitting the web formatted content to the server;

creating a web page to include a) the web formatted content and b) an address identifying a location of the message formatted content as stored in the server;

transmitting the web page to the server;

wherein the web page, when retrieved from the server and displayed in the browser, enables:

i) selection of the web formatted content, and ii) selection of a destination device in which to forward the web formatted content from the server in the web network environment, the destination device being located in the message servicing network environment;

wherein converting the selected content into message formatted content includes converting an image file in a first format to a format according to an MMS (Multimedia Messaging Service) standard;

wherein converting the selected content into the web formatted content includes converting the image file to a format suitable for displaying a rendering of the selected content in a web page;

wherein uploading the web formatted content and the message formatted content to the server enables the server to selectively:

i) serve the selected content formatted according to the first format to the web browser, and ii) enable a gateway provider communicating with the server to retrieve the message formatted content from the server, the gateway provider, in turn, capable of forwarding the message formatted content to the mobile device in the message servicing network environment;

wherein the client computer is operated by a first party that initiates creation of the web page for distributing the selected content, the first party transmitting the web page to the server to make the web page accessible to a second party that is able to access the web page and view the web formatted content in the web page;

wherein the browser is operated by the second party, the browser enabling:

retrieval of the web page by the second party;

viewing of the web page and the web formatted content by the second party;

input to the web page by the second party to select the destination device, the destination device being operated by a third party; and based on selection of the destination device by the second party, forwarding of the message formatted content to the destination device operated by the third party.

2. A computer-implemented method as in claim 1, wherein the web page, when retrieved from the server and displayed in the browser, further enables:

iii) in response to selection of the web formatted content and the destination device through the web page, generation of a request to the gateway provider to retrieve the message formatted content from the server for delivery of the message format content to the destination device in the message servicing network environment.

3. A computer-implemented method as in claim 1 further comprising:

displaying a predetermined sequence of screenshots in a graphical user interface to guide a user through creation of the web page, the web page including the rendering of the selected content based on the web formatted content, the predetermined sequence of screenshots enabling the user to:

i) choose a category of downloadable content, ii) choose the selected content for inclusion of the web formatted content in the chosen category along with other downloadable content, iii) select a visual theme associated with the category of downloadable content, iv) create the web page to include the web formatted content and other downloadable content, and v) transmit the web page to the server in response to receipt of an appropriate username and password from the user.

4. A computer-implemented method as in claim 1 further comprising:

generating a layout including the rendering of the selected content according to a web format;

creating the web page based on the layout;

in the web page, associating the address to the message formatted content stored in the server;

receiving a command to preview the web page prior to uploading of the web page to the server.

5. A computer-implemented method as in claim 4 further comprising:

generating an image illustrating how the web page will appear, when retrieved from the server, to the browser in the web network environment.

6. A computer-implemented method as in claim 1 further comprising:

receiving identification of a selected category of multiple categories maintained by the client computer in which to associate the selected content, each of the multiple categories being used by the client computer to maintain similar types of other content that also can be selectively communicated to the mobile device in the message servicing network environment;

creating the web page for the selected category;

associating the selected content to the selected category such that the selected content appears with the other content for viewing in the web page when downloaded to a respective browser in the web network environment; and the web page enabling selection of content associated with the web page for delivery to the mobile device in message servicing network environment.

7. A computer-implemented method as in claim 6 further comprising:

enabling customization of a visually displayed theme associated with the selected content to be displayed in the web page.

8. A computer-implemented method as in claim 1 further comprising:

creating the web page to include the rendering of the selected content according to a web format;

transmitting the web page to the server, the web page, when retrieved from the server and displayed in the browser, enabling operations of:

i) generation of a request to the gateway provider to retrieve the message formatted content from the server based on an identifier for delivery of the message format content to a destination device in the message servicing network environment, and ii) payment to the gateway provider by the second party that initiates delivery of the message formatted content in the server to the destination device in the message servicing network environment.

9. A computer-implemented method as in claim 8 in which the web page transmitted to the server enables delivery of the message formatted content in the server to a destination cellular phone device and the message servicing network environment is a cellular phone message servicing network environment, the message formatted content including multimedia content formatted according to the MMS (Multimedia Message Servicing) standard for delivery to the destination cellular phone device.

10. A computer-implemented method as in claim 1 further comprising:

creating the web page to include i) a rendering of the selected content according to a web format, and ii) the address associated with the message formatted content as stored in the server;

transmitting the web page to the server; and enabling retrieval of the web page from the server for editing; and transmitting a modified web page to the server.

11. A client computer system operating in a web-based environment, the client computer system comprising:

a processor;

a memory unit that stores instructions associated with an application executed by the processor; and an interconnect coupling the processor and the memory unit, enabling the client computer system to execute the application and perform operations of:

receiving selected content;

converting the selected content into message formatted content to enable communication of the selected content in a respective message through a message servicing network environment to a mobile device, the message servicing network capable of operating independently of the web network environment to deliver messages to the mobile device;

receiving identification of a server in the web network environment;

transmitting the message formatted content to the server;

converting the selected content into web formatted content to enable communication of the selected content to a browser operating in the web network environment;

transmitting the web formatted content to the server;

creating a web page to include a) the web formatted content and b) an address identifying a location of the message formatted content as stored in the server;

transmitting the web page to the server; and wherein the web page, when retrieved from the server and displayed in the browser, enables:

i) selection of the web formatted content, and ii) selection of a destination device in which to forward the web formatted content from the server in the web network environment, the destination device being located in the message servicing network environment;

wherein converting the selected content into message formatted content includes converting an image file in a first format to a format according to an MMS (Multimedia Messaging Service) standard;

wherein converting the selected content into the web formatted content includes converting the image file to a format suitable for displaying a rendering of the selected content in a web page;

wherein uploading the web formatted content and the message formatted content to the server enables the server to selectively:

i) serve the selected content formatted according to the first format to the web browser, and ii) enable a gateway provider communicating with the server to retrieve the message formatted content from the server, the gateway provider, in turn, capable of forwarding the message formatted content to the mobile device in the message servicing network environment;

wherein the client computer system is operated by a first party that initiates creation of the web page for distributing the selected content, the first party transmitting the web page to the server to make the web page accessible to a second party that is able to access the web page and view the web formatted content in the web page;

wherein the browser is operated by the second party, the browser enabling:

retrieval of the web page by the second party;

viewing of the web page and the web formatted content by the second party;

input to the web page by the second party to select the destination device, the destination device being operated by a third party; and based on selection of the destination device by the second party, forwarding of the message formatted content to the destination device operated by the third party.

12. A client computer system as in claim 11 further supporting operations of:

receiving identification of a selected category of multiple categories maintained by the client computer system in which to associate the selected content, each of the multiple categories being used by the client computer system to maintain similar types of other content that also can be selectively communicated to the mobile device in the message servicing network environment;

creating a web page for the selected category;

associating the selected content to the selected category such that the selected content appears with the other content for viewing in the web page for the selected category when the web page for the selected category is downloaded to a respective browser in the web network environment; and via the web page for the selected category, enabling selection of content for delivery to the mobile device in the message servicing network environment;

enabling customization of a visually displayed theme associated with the selected content to be displayed in the web page for the selected category.

13. A client computer system as in claim 11 further supporting operations of:

guiding a user through a predetermined sequence of steps to create the web page including the selected content, the predetermined sequence of steps enabling the user to:

i) choose a category of downloadable content, ii) choose the selected content for inclusion of the web formatted content in the category along with the downloadable content, iii) select a visual theme associated with the category of downloadable content, and iv) upload the web page to the server after prompting the user for a username and password.

14. A computer program product including a physical computer-readable medium having instructions stored thereon for processing data information in a client computer, such that the instructions, when carried out by a processing device, enable the processing device to perform the steps of:

receiving selected content;

converting the selected content into message formatted content to enable communication of the selected content in a respective message through a message servicing network environment to a mobile device, the message servicing network capable of operating independently of the web network environment to deliver messages to the mobile device;

receiving identification of a server in the web network environment;

transmitting the message formatted content to the server;

converting the selected content into web formatted content to enable communication of the selected content to a browser operating in the web network environment;

transmitting the web formatted content to the server;

creating a web page to include a) the web formatted content and b) an address identifying a location of the message formatted content as stored in the server;

transmitting the web page to the server; and wherein the web page, when retrieved from the server and displayed in the browser, enables:

i) selection of the web formatted content, and ii) selection of a destination device in which to forward the web formatted content from the server in the web network environment, the destination device being located in the message servicing network environment;

wherein converting the selected content into message formatted content includes converting an image file in a first format to a format according to an MMS (Multimedia Messaging Service) standard;

wherein converting the selected content into the web formatted content includes converting the image file to a format suitable for displaying a rendering of the selected content in a web page;

wherein uploading the web formatted content and the message formatted content to the server enables the server to selectively:

i) serve the selected content formatted according to the first format to the web browser, and ii) enable a gateway provider communicating with the server to retrieve the message formatted content from the server, the gateway provider, in turn, capable of forwarding the message formatted content to the mobile device in the message servicing network environment;

wherein the client computer is operated by a first party that initiates creation of the web page for distributing the selected content, the first party transmitting the web page to the server to make the web page accessible to a second party that is able to access the web page and view the web formatted content in the web page;

wherein the browser is operated by the second party, the browser enabling:

retrieval of the web page by the second party;

viewing of the web page and the web formatted content by the second party;

input to the web page by the second party to select the destination device, the destination device being operated by a third party; and based on selection of the destination device by the second party, forwarding of the message formatted content to the destination device operated by the third party.

15. A computer program product as in claim 14 further supporting operations of:

receiving identification of a selected category of multiple categories maintained by the client computer in which to associate the selected content, each of the multiple categories being used by the client computer to maintain similar types of other content that also can be selectively communicated to the mobile device in the message servicing network environment;

creating a web page for the selected category;

associating the selected content to the selected category such that the selected content appears with the other content for viewing in the web page for the selected category when the web page for the selected category is downloaded to a respective browser in the web network environment; and enabling customization of a visually displayed theme associated with the selected content to be displayed in the web page for the selected category.

16. A computer program product as in claim 14 further supporting operations of:

guiding a web page developer via a wizard through a sequence of steps to create the web page including the selected content, the sequence of steps enabling the web page developer to:

i) choose a category of downloadable content, ii) choose the selected content for inclusion of the web formatted content in the category along with the downloadable content, iii) select a visual theme associated with the category of downloadable content, and iv) upload the web page to the server after prompting the user for a username and password.

17. A computer-implemented method as in claim 1, wherein the mobile device is a wireless phone device and wherein the message servicing network is a phone network supporting:

i) delivery of the message formatted content to the wireless device from the server, and ii) communications between the wireless phone device and other wireless phone devices in which the communications are conveyed independently of the web network environment.

18. The computer-implemented method as in claim 1, wherein the browser receives the web formatted content to produce a first rendition of the selected content for viewing by the second party on the browser; and wherein the destination device receives the message formatted content to produce a second rendition of the selected content for viewing by the third party, the web formatted content being a different format than the message formatted content.

19. The computer-implemented method as in claim 18 further comprising:

during creation of the web page by the first party, providing notification to the first party that the first party can receive a commission based on subsequent use of the web page by the second party to forward the message formatted content to the third party at the destination device.

* * * * *